Patented Nov. 8, 1938

2,136,219

UNITED STATES PATENT OFFICE 2,136,219

GRAVITY METER

Serge Alexander Scherbatskoy, Tulsa, Okla.

Application January 29, 1938, Serial No. 187,759

9 Claims. (Cl. 265—1.4)

This invention relates primarily to systems employed for determining small differences in the force of gravity and its variations from point to point over the earth's surface. It has particular reference to the determination of the variations in the gravity constant, usually designated by the symbol $g$, and its relation to geophysical exploration work.

It has been recognized for some time that the force of gravity or the value of $g$, varies somewhat from place to place, even over a relatively small area, in accordance with the differences in the structure of the earth's crust. For example, a formation of relatively dense structure, either protruding from the earth or entirely hidden below the earth's surface, will bring about an increase in the value of $g$, while intrusion of a relatively light body at a particular point below the earth's surface will tend to decrease the value of $g$ at that point. This fact has been relied upon as an aid to the location of hidden deposits of various kinds and methods based upon it are particularly well suited to regions where definite variations of the value of $g$ may be taken to indicate with fair certainty a particular formation. For example, in the Gulf Coast region of the United States, it has been discovered that certain variations in the value of $g$ from the normal value to be expected at the particular locality have been found to constitute a reliable indication of the presence of a salt dome. This in turn is indicative of a structure suitable for the accumulation of oil.

Various methods have been suggested in the past for determining the gravity variations over large areas. One form of device commonly employed for this purpose is known as a gravimeter. The gravimeter consists essentially of a mass supported by means of a spring from a fixed support. The mass when subjected to the effects of varying gravity performs minute motions which are usually measured by optical means. (See "Gravimeter Design and Operation" by A. B. Bryan, published in Geophysics Vol. II, No. 4, October 1937, pp. 301–308.)

It has been the experience of the prior art that when a high degree of precision is required the elongation of a spring cannot be used as an exact measure of gravity variation. Because of various elastical imperfections of a spring such as hysteresis, fatigue effects, permanent structural deformation, etc., any process which involves elongation of a spring is non-reversible and, therefore, is not adapted for attaining a great precision.

The non-reversibility of the spring is considered to be the essential and the most important limitation preventing the attainment of considerably greater precision. Assume that the gravimeter had been initially positioned at a certain location A, at which the pull of the earth upon the mass causes a corresponding initial elongation of the spring, and that subsequently the gravimeter was displaced to another location B, at which the gravity constant is greater. Consequently, at the station B the elongation of the spring has increased and according to the method practiced in the prior art, an increased elongation has been interpreted as an indication of the increased gravity constant. Assume now that the gravimeter has been returned from the station B to its prior position at the station A, and consequently, the suspended mass was again subjected to the same force of attraction as initially. Experience shows that the elongation of the spring does not return to its initial value, but assumes a new value which is slightly larger than the initial value. It is apparent now that an erroneous conclusion might be drawn which would consist in a statement that the force of gravity at the station A prior to its position at B is smaller than the force of gravity at the station A after the gravimeter was returned to its initial position. It is, therefore, apparent that the elongation of the spring cannot be considered as a precise indication of the gravity force.

Accordingly, it is an object of my invention to provide a gravimeter in which the inexactitude resulting from the elastic imperfections of the spring is eliminated.

It is another object of my invention to provide a gravimeter which will be simple and reliable in operation.

Further objects of my invention will become more apparent by consideration of a detailed description in conjunction with the accompanying drawing.

The present apparatus consists essentially of a mass suspended from a fixed support by means of a spring, of a means for constraining the mass to perform displacements which are extremely small as compared to those which would normally result if the mass were subjected to the effect of a varying gravitational force, the said constraining means comprising an element responsive to the departure of the mass from the determined position, and acting upon the mass in order to counterbalance the departure and means for determining forces related to the said constraining effect.

active at the same time, and namely the tube 6 in which the voltage received from 57 adds to the voltage received from 61 is active while the other tube in which the said voltages subtract one from another is inactive, since the latter tube is biased to cutoff.

Consequently, a current is delivered from the battery 72 to the resistor 73 through the tube 66, while at the same time the tube 67 is inactive. This current causes a voltage to appear across the terminals 76, 77, the polarity of this voltage being such that the terminal 76 is negative and the terminal 77 positive.

It is thus seen that under the conditions as outlined above, the voltage from the terminals 76, 77 supplies a current to the coil 56. The adjacent coil 54 receives the current from the battery 60 and from the mutual interaction of the coils 54, 56 there appears a force which tends to attract the coils one to another and consequently, tends to move the mass 50 in the upward direction and opposes the increase in gravity.

It should be kept in mind that the force developed by the mutual interaction of coils 54, 56 opposes the increase in gravity but does not counterbalance it entirely. That is, under the effect of an increase in gravity the mass 50 tends to displace itself downward and the action of the coils 54, 56 is such that this displacement tends to be reduced but does not reduce to zero, and the mass 50 assumes a new position of equilibrium at which the opposing force which has been built up between coils 54 and 56 is sufficient to counterbalance the effect of the gravity increase and the increase in elongation of the spring. It is, however, apparent that the incremental elongation of the spring which corresponds to the new position of equilibrium is smaller than the incremental elongation that would normally result, if the increment of gravity would act alone and there were no opposing effect of the force derived from the coils 54, 56. The incremental elongation of the spring is reduced by an amount dependent upon the degree of amplification of the amplifier 62. By increasing this amplification, the incremental elongation of the spring (corresponding to a given increment of gravity) can be reduced indefinitely to a value as small as is desired. The force derived from the coils 54, 56 at the new position of equilibrium expresses the magnitude of the gravity change. It is apparent that the magnitude of this force depends upon the current flowing through the coil 56. Thus by measuring the current indicated by the pointer direct information may be derived as to the gravity change in the new location.

Assume now that the magnitude of the force of gravity at the new location is smaller. Consequently, the winding 57 becomes displaced upwards and the distance between 57, 58 becomes smaller than the distances between 57, 59. Then the difference flux interlinking with 57 will have the same polarity as the flux obtained from 58 and consequently, will be 180 degrees out of phase with respect to the difference flux obtained previously. Under these conditions, the electromotive force induced across the output terminals of the winding 57 will be 180 degrees out of phase as compared with the electromotive force generated in the location in which the gravity has increased instead of decreasing.

It is, therefore, apparent that the output voltage of 57 indicates the change in gravity at a new location. The magnitude of this voltage expresses the magnitude of the change, and the phase of the voltage expresses the direction of the change, i. e., indicates whether at the particular location the gravity has increased or decreased.

Under the present conditions corresponding to a decrease of gravity at the new location, the phase relations in the grid circuits of the tubes 66, 67 have been reversed, i. e., in the grid circuits of the tube 66 the voltage derived from 57 subtracts from the voltage derived from 61 while in the grid circuit of the tube 67 the voltage derived from 57 adds to the voltage derived from 61. Then, a current is delivered from the battery 72 to the resistor 74 while at the same time the tube 66 is inactive. Consequently, there appears a voltage between the terminals 76, 77 the polarity of which will be reversed as compared with the voltage appearing across the terminals 76, 77 under the prior conditions corresponding to an increase in gravity, and a current will flow through the winding 56 in a direction which is opposite to the one occurring under the prior conditions. Consequently, the force resulting from the mutual interaction of the coils 54 and 56 has reversed its sign, i. e., both coils exercise a repulsive action one upon the other and thus tend to counterbalance the decrease of gravity and to move the mass 50 to its neutral position.

Thus a method has been provided in which the tension of the spring 52 is maintained substantially constant in spite of the gravity variations applied to the mass 50. This is effected by applying a counterbalancing force derived from the current flowing through the coil 56. It is apparent that the magnitude of this current expresses the magnitude of the gravity difference and the direction of this current indicates the character of the gravity change, i. e., whether the gravity has increased or decreased in the new location. Thus by measuring the current flowing through the coil 56 direct information may be derived as to the gravity change in the new location.

In accordance with my invention, I have, therefore provided a galvanometer 89 which indicates the current flowing through the coil 56 and therefore shows the amount and the direction of the gravity changes occuring during the gravitational survey.

Due to the appreciable inertia of the mass 50, any small gravity difference that acts upon the mass when the transportation clamps 89a and 89b are released will develop forces that tend to bring about oscillatory motion. The mass will oscillate about or "hunt" about its position of equilibrium. In order to prevent such an oscillatory motion an antihunting arrangement containing coils 53, 55 is provided and tends to eliminate any tendency of the mass to "hunt", i. e., eliminates the parisitic oscillatory motions which retard considerably the matter of bringing the mass to rest.

The antihunting arrangement results from the force developed by the mutual interaction of coils 53 and 55. The coil 53 receives the current from the D. C. source 60 in the same manner as the coil 54. The coil 55 has its input terminals connected to 86, 87 respectively.

It is noted that the voltage across the terminals 76, 77 represents the displacement of the mass 50 from its neutral position and the voltage across the terminals 86, 87 expresses the second time derivative of the voltage across the terminals 76, 77. Therefore, the said time derivative represents the acceleration of the mass 50. Consequently, the voltage and the current applied to the coil 55 expresses in direction and in the magnitude the acceleration to which the mass is subjected. Since the current flowing through the coil 53 is constant and the current flowing through the coil 55 changes its value with the acceleration of the mass 50, the force resulting from the intersection of these two coils has a magnitude and direction depending upon the acceleration of the mass 50. This force has been determined in such a manner as to oppose the force of the acceleration of the mass 50. Therefore, the mass 50 will behave itself as if it were inertialess and subjected only to the force resulting from the differences of gravity.

It is apparent that the antihunting device as above described is a desirable but not an essential part of the apparatus. If in the apparatus, as shown in the drawing, the elements 75, 85, 55, 53 were eliminated the mass 50 would be subjected to hunting and if the apparatus be moved to a location of a different gravity constant, a relatively long time interval would be necessary for the mass 50 to attain rest and consequently, a delay in reading would occur.

It will be understood that the device illustrated is mounted in a suitable frame and casing and that the parts may be arranged in other manners than that shown. I have here represented them in such positions as to make the drawing most clear, rather than in such positions as they would best be placed in actual construction.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

I claim:

1. In an apparatus for determining variations of gravity, an elastic member, a gravity sensitive member attached to the elastic member, the said gravity sensitive member being subjected to a varying force of gravity, means responsive to the variation of gravity for applying an additional force maintaining the stress of the elastic member substantially uniform, and means for determining the magnitude of the said additional force.

2. In an apparatus for effecting measurements of gravity, a mass, a fixed support, a spring supporting said mass from the said support, means responsive to the displacement of the mass from its mean position under the effect of a varying force of gravity for applying an additional force upon the mass, whereby the said additional force together with the force of gravity maintain the mass substantially at its mean position, and means for determining the magnitude of the said additional force as a measure of variation of gravity.

3. In an apparatus for effecting measurements of gravity, a fixed support, a mass, a spring supporting the said mass from the said support, means for constraining the mass to occupy a determined and a substantially constant position when subjected to the effect of a varying gravitational force, the said constraining means comprising an element responsive to the departure of the mass from the said determined position and an electrical field controlled by the said element, the said electrical field acting upon the said mass in order to counterbalance the said departure, and means for determining the strength of the said electrical field as a measure of variation of gravity.

4. In an apparatus for effecting measurements of gravity, a fixed support, a mass, a spring supporting the said mass from the said support, means responsive to the displacement of the mass from its mean position under the effect of a varying force of gravity for producing an electrical signal, means responsive to the said electrical signal for producing an additional force upon the mass, whereby the said additional force together with the force of gravity maintain the mass substantially at its mean position, and means for determining the magnitude of the said additional force as a measure of variation of gravity.

5. In an apparatus for effecting measurements of gravity, a mass, a fixed support, a spring supporting said mass from the said support, means responsive to the displacement of the mass from its mean position under the effect of a varying force of gravity for producing an electrical signal, means for producing an electromagnetic field influencing the position of the mass and responsive to the said electrical signal, means for applying the said signal to the said field in a manner as to maintain the mass substantially at its mean position, means for determining the conditions of the said electromagnetic field.

6. In an apparatus for effecting measurements of gravity, a mass, a fixed support, a spring supporting said mass from the said support, means responsive to the displacement of the mass from its mean position under the effect of a varying force of gravity for applying an additional force upon the mass, whereby the said additional force together with the force of gravity maintain the mass substantially at its mean position, means for preventing free oscillations of the mass around its mean position, and means for determining the magnitude of the said additional force.

7. In an apparatus for effecting measurements of gravity, a fixed support, a mass, a spring supporting the said mass from the said support, means for constraining the mass to occupy a determined and a substantially constant position when subjected to the effect of a varying gravitational force, the said constraining means comprising an element responsive to the departure of the mass from the said determined position and an electrical field controlled by the said element, the said electrical field acting upon the said mass in order to counterbalance the said departure, means for preventing free oscillation of the mass around its mean position, and means for determining the strength of the said said electrical field.

8. In an apparatus for effecting measurements of gravity, a fixed support, a mass, a spring supporting the said mass from the said support, means responsive to the displacement of the mass from its mean position under the effect of a varying force of gravity for producing an electrical signal, means responsive to the said electrical signal for producing an additional force upon the mass, whereby the said additional force together with the force of gravity maintain the mass substantially at its mean position, means for preventing free oscillations of the mass around its mean position, and means for determining the magnitude of the said additional force.

9. In an apparatus for effecting measurements of gravity, a mass, a fixed support, a spring supporting said mass from the said support, means responsive to the displacement of the mass from its mean position under the effect of a varying force of gravity for producing an electrical signal, means for producing an electromagnetic field influencing the position of the mass and responsive to the said electrical signal, means for applying the said signal to the said field in a manner as to maintain the mass substantially at its mean position, means for preventing free oscillations of the mass around its mean position, means for determining the conditions of the said electromagnetic field.

SERGE ALEXANDER SCHERBATSKOY.

Nov. 8, 1938.　　A. W. SHEPHERD　　2,136,220
CONTROL SWITCH
Filed Aug. 16, 1935　　3 Sheets-Sheet 1
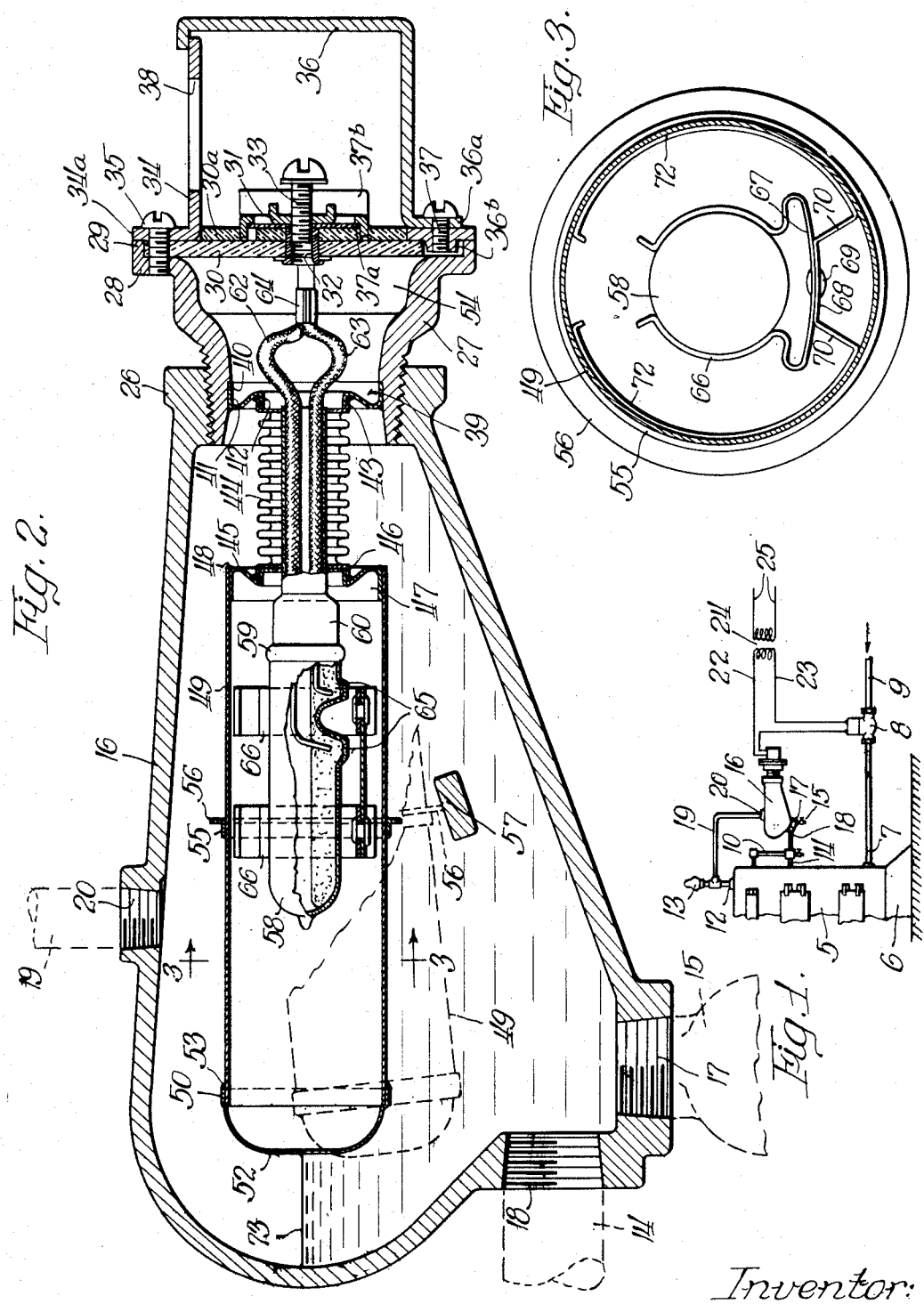
Inventor:
Alfred W. Shepherd